United States Patent [19]

LaDue

[11] 4,023,435

[45] May 17, 1977

[54] SNAP FIT BOWDEN CABLE ATTACHMENT

[75] Inventor: Brian J. LaDue, Kokomo, Ind.

[73] Assignee: General Motors Corporation, Detroit, Mich.

[22] Filed: Oct. 18, 1974

[21] Appl. No.: 516,102

Related U.S. Application Data

[63] Continuation of Ser. No. 380,974, July 20, 1973, abandoned.

[52] U.S. Cl. .......................... 74/501 P; 24/230 SC
[51] Int. Cl.² ........................................ F16C 1/10
[58] Field of Search ........... 74/501 R, 501 P; 64/3, 64/4; 292/171, 125, 133, 141; 339/256 SP, 258 S; 24/230, 230 SC, 230 SL, 230 CF, 213 R, 214, 208 A, 217

[56] References Cited

UNITED STATES PATENTS

| 2,760,173 | 8/1956 | Cunningham | 339/256 SP |
| 2,891,103 | 6/1959 | Swengel | 74/501 P |
| 3,139,768 | 7/1964 | Biesecker | 74/501 R |
| 3,263,520 | 8/1966 | Tschanz | 74/501 P |
| 3,601,754 | 8/1971 | Filson | 339/256 SP X |
| 3,662,617 | 5/1972 | Bennett et al. | 74/501 R |

Primary Examiner—Samuel Scott
Assistant Examiner—Frank H. McKenzie, Jr.
Attorney, Agent, or Firm—Arthur N. Krein

[57] ABSTRACT

A snap fit cable attachment for a bowden cable wherein a bowden cable flag and a cable mounting support member are interlocked together by means of a plug and socket arrangement with a snap tab on one of the elements and an abutment for the snap tab on the other element.

12 Claims, 6 Drawing Figures

SNAP FIT BOWDEN CABLE ATTACHMENT

This is a continuation of application Ser. No. 380,974, filed July 20, 1973 now abandoned.

This invention relates to a device for securing a bowden cable flag to a base plate and, in particular, to a snap fit bowden cable attachment.

Motion-transmitting remote control assemblies of the type normally utilized in automotive vehicles for transmitting forces along a curved path to operate components, such as air vent controls and heater controls, typically include a flexible conduit secured to an apertured end fitting having a flange or flag thereon which is adapted to be attached to a support structure and a motion-transmitting core element movably disposed within the conduit and the end fitting. The conduit, suitably secured at opposite ends to the support structure of the vehicle, is arranged so that end of the core element may be attached to the element to be controlled while the opposite end of the core element is attached to a controlling member, such as a manually actuable control knob, adjacent to the instrument panel. The transmitting core element is normally in the form of a flexible cable and this cable with the flexible conduit are commonly referred to as a bowden cable.

The end fitting having the apertured flange, commonly referred to as a bowden flag, may be a separate element with an aperture extending longitudinally through the body thereof to guide and support the core element and is secured to the conduit, or alternatively it may be formed integral with the flexible conduit.

In the prior art, these end fittings or bowden cable flags were normally provided with a mounting aperture in the flange portion thereof so as to permit their mounting as by means of a screw to a suitable support member of the vehicle; for example, to the heater and air conditioning control head assembly which itself is attached to the instrument panel of the vehicle. With this prior art type bowden cable flag, a screw was necessary for attachment of a bowden cable flag to its support member and, of course, a tool was required for installation of the screw.

It is, therefore, the primary object of the invention to provide a bowden cable attachment arrangement whereby a bowden cable flag can be secured to a support member by a snap fit tab and interlock arrangement between the bowden cable flag and its support member.

Another object of the present invention is to provide a snap fit bowden cable attachment arrangement whereby a bowden cable flag can be assembled and disassembled with respect to its cable mounting support member without the use of an assembly tool.

These and other objects of the invention are attained in a motion-transmitting remote control assembly by the use of a bowden cable flag fitting in which the flag portion thereof is used as a plug to be inserted into the cavity of a socket in a cable mounting support member, these elements being further interlocked together by means of a flexible snap tab on one of these elements and by an abutment for the snap tab on the other of these elements.

For a better understanding of the invention, as well as other objects and further features thereof, reference is had to the following detailed description of the invention to be read in connection with the accompanying drawings, wherein.

Figures 1, 2:
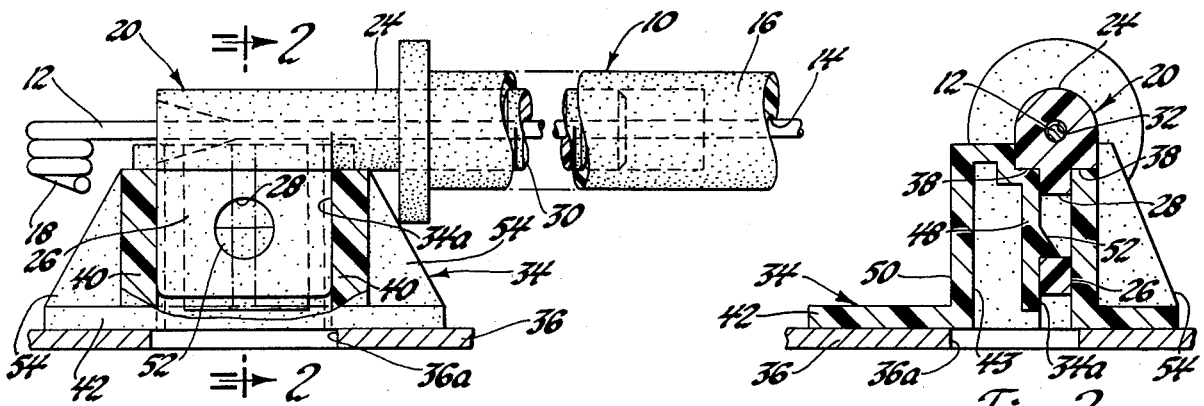
FIG. 1 is a side elevation view of one end of a motion-transmitting remote control assembly with the cable flag fitting of the assembly and the support member to which it is mounted, constructed in accordance with a preferred embodiment of the invention.
FIG. 2 is a sectional view of the cable flag and support member of FIG. 1 taken along Line 2—2 of FIG. 1.
Figures 3, 4:
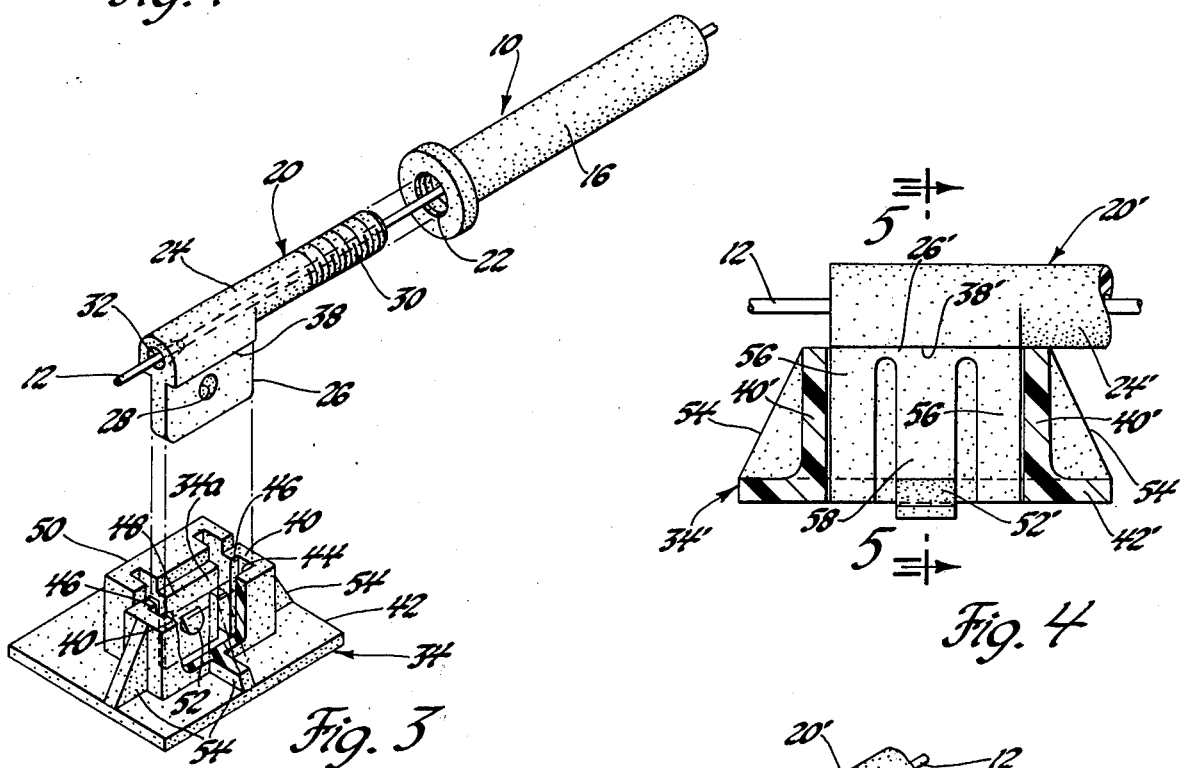
FIG. 3 is an exploded perspective view of the end of the motion-transmitting remote control assembly of FIG. 1.
FIG. 4 is an elevation view with the support member in section of an alternate embodiment of a cable flag fitting and support member assembly.

Referring now to FIGS. 1, 2 and 3 of the drawings, there is shown one end of a remote control assembly, generally indicated by the reference numeral 10, positioned by means of a snap fit cable attachment constructed in accordance with one embodiment of the invention, only one end of the remote control assembly being shown. As shown, the remote control assembly 10 includes a flexible motion-transmitting core element in the form of a cable 12 slidably received in a centrally located axial extending aperture 14 through a flexible conduit 16. The motion-transmitting core element or cable 12 is adapted at the ends thereof for attachment to control members, not shown, as by having each end thereof formed into a series of coils, which are commonly collectively referred to as a "pigtail" 18.

A cable flat support fitting, hereinafter referred to as fitting 20, is disposed about or adjacent to an end of the conduit 16 for attaching the conduit to a suitable support structure, such as the body of a vehicle or a component assembly secured thereto. In this embodiment, the fitting is formed as a separate element with an end threadingly received in an enlarged threaded bore 22 in the end of conduit 16, although it is to be realized that other suitable means may be used to fasten the fitting to the conduit or, if desired, the fitting can be formed integral with the conduit.

The fitting 20, as shown in FIGS. 1, 2 and 3, includes a tubular body 24 with a flange or cable flag 26 extending radially from one end thereof with a central hole 28 therein. One end of the body 24, the end opposite cable flag 26, is externally threaded as at 30 for engagement in the threaded bore 22 of conduit 16 and is provided with an axial extending guide passage 32 therethrough to slidably receive a portion of cable 12.

This fitting, as just described, would basically correpond to a conventional cable flag fitting with the hole 28 in the flange or cable flag 26 adapted to receive an appropriate fastener, such as a screw, whereby this fitting could be secured to a support structure.

However, in accordance with the invention, the flag of fitting 20 is adapted as a plug to permit its snap fit attachment into a socket provided for this purpose in a cable mounting support member 34, which may be formed as an integral part of a component assembly, such as a heater and air conditioning control head assembly secured to the vehicle body, or, as shown, the support member 34 may be formed as a separate element secured in a suitable manner, not shown, to a vehicle body plate 36.

For this purpose, the flange or cable flag 26 is of a predetermined length and thickness to serve as a suitable plug for insertion into a mating socket cavity in a support member, and at the junction of the cable flag 26 to the tubular body 24 there is provided shoulders 38 on opposite sides of the flag 26 and at right angles thereto, the shoulders acting as a stop to limit penetration of the flag (plug) into the socket in the support member.

The support plate 34, as illustrated in FIGS. 1, 2 and 3, is provided with wall means defining a socket cavity 34a to receive the plug portion of fitting 20, that is cable flag 26, the wall means including a snap tab in the form of a flexible wall having a cam and lock arrangement thereon defining a protuberance hindering movement of the cable flag into the socket cavity. As shown, the socket cavity of the support member 34 is defined by spaced-apart end walls 40 upstanding from and extending lateral across a portion of mounting flange 42 of the support member around the opening 43 in the flange 42, a full front wall 44 and partial rear wall segments 46, with reference to FIG. 3, extending from end walls 40, and a flexible rear wall portion 48 movably positioned between the rear wall segments 46, the rear wall portion 48 being formed integral with the short leg of an inverted J-shaped support wall 50 also upstanding from mounting flange 42. The top of the walls 40, 44 and 46 are of uniform height so that they, with the rear wall portion 48, will form a seat for shoulders 38 of fitting 20. Rear wall portion 48 is provided with a cam and lock pin 52 thereon extending into the socket cavity for engagement with the cable flag 26 and in alignment with the hole 28 in the cable flag when it is fully inserted into the socket cavity. In addition, suitable support webs 54 are provided which extend from the mounting flange 42 to the walls 40 and 44 to limit flexing of these walls.

Support member 34 is preferably formed as a molding of a plastic material, such as an acetal resin or similar material, which is relatively rigid but has limited flexibility. This limited flexibility characteristic of the molded material will permit the flexible rear wall 48, upon insertion of the cable flag 26 into the socket cavity, to be deflected in a direction, clockwise as seen in FIG. 2, when the cam portion of the cam and lock pin 52 is engaged by the bottom portion of the cable flag to allow full penetration of the cable flag into the socket opening, after which the flexible rear wall 48 can return to its normal position, the position seen in FIG. 2, whereby the cam and lock pin 52 will extend into the hole 28 in the cable flag 26 with the lock portion thereof engaged against the peripheral wall portion of the cable flag surrounding hole 28, which, in effect, forms an abutment engaging the lock portion to releasably lock cable flag fitting 20 on the support member 34.

Preferably, the body plate 36 is provided with an opening 36a whereby a screwdriver or similar tool may be inserted into the cavity in the support member to permit disassembly of the cable flag fitting 20 from the support member 34, if desired. The tool would be inserted from the underside of base plate 34 through opening 36a to engage the flexible rear wall 48 to move it and the cam and lock pin 52 carried thereby out of engagement with the cable flag 26 to permit it to be withdrawn from the socket cavity.

In the embodiment just described, the snap tab, which is the flexible rear wall 48 with the cam and lock pin 52 thereon, is formed as part of the support member 34 while the abutment for this snap tab is formed as part of the cable flag 26 of fitting 20, but it is to be realized that the location of the snap tab and abutment can be reversed. Thus, in the alternate embodiment illustrated in FIGS. 4, 5 and 6, the snap tab is formed as part of the cable flag while the abutment therefor is formed on the support member for this cable flag.

Figure 5:
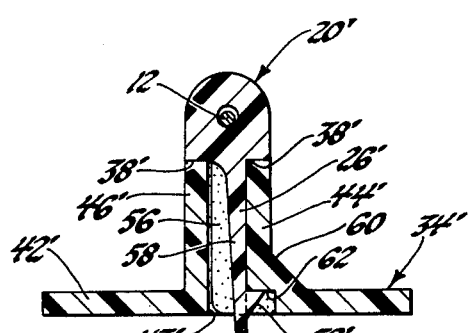
FIG. 5 is a sectional view of the cable flag fitting and base plate assembly of FIG. 4 taken along Line 5—5 of FIG. 4.
Figure 6:
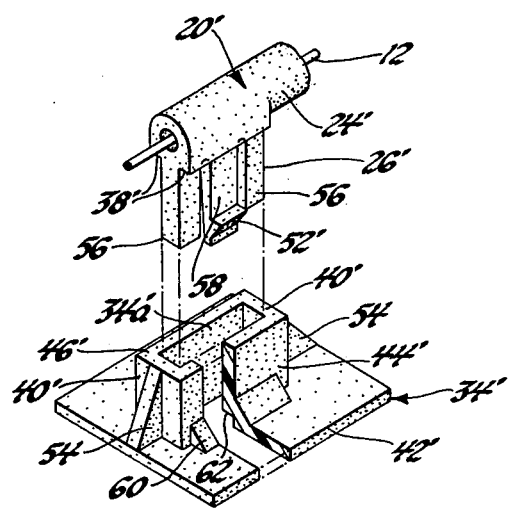
FIG. 6 is an exploded perspective view of the cable flag fitting and support member assembly of FIG. 4.

Referring now to the embodiment of the snap fit bowden cable attachment shown in FIGS. 4, 5 and 6, wherein like numerals indicate like or corresponding parts to those previously described, the cable flag fitting 20' has a tubular body portion 24' with a radial extending flange or cable flag 26' at one end thereof. Cable flag 26' includes two spaced-apart rigid wall portions 56 of a thickness to be slidably received in the socket cavity 34'a of support member 34', to be described, and positioned between and spaced from these wall portions 56 is a snap tab in the form of a flexible wall 58 of reduced thickness having a cam and lock pin 52' adjacent to the free end thereof. The cam and lock pin 52' is arranged on the flexible wall 58 so that when this wall is in a released, or as formed position, as shown in FIGS. 5 and 6, with one side surface of this wall positioned in a common plane with corresponding side surfaces of wall portion 56, the cam and lock pin 52' will extend outward away from these wall surfaces to define a protuberance hindering insertion of the cable flag 26' into the socket cavity 34'a in support member 34'. As in the previous described embodiment, at the junction of the wall portions 56 and 58 of cable flag 26' to the body 24', there is provided shoulders 38' on opposite sides of cable flag 26' and at right angles thereto.

Support member 34', as seen in FIGS. 4, 5 and 6, is provided with spaced-apart end walls 40' connected at their ends with front wall 44' and rear wall 46', with reference to FIG. 6, upstanding from a mounting flange 42' and positioned around an opening 43' therethrough, these walls defining a socket cavity 34'a extending from the free ends of these walls through the opening 43'. Front wall 44' overhangs the opening 43' in mounting flange 42' but is connected to this flange by an interconnecting web 60, so as to provide an abutment shoulder 62 against which the lock portion of cam and lock pin 52' can engage to releasably lock the cable flag fitting 20' to the support member 34'. As in the previous embodiment, support webs 54 are preferably used to reinforce the end walls 40'.

In this embodiment, the cable flag fitting 20' is preferably formed as a molding of a plastic material, such as acetal resin or similar material, which is relatively rigid but has limited flexibility. This limited flexibility characteristic of the molded material will permit the flexible wall 58 with the cam and lock pin 52' thereon to act as a snap tab capable, upon insertion of the cable flag 26' into the socket cavity of base plate 34', to be deflected in a direction clockwise as seen in FIG. 5, when the cam and lock pin 52' is engaged by the wall 44' to allow full penetration of this cable flag into the socket cavity 34'a after which the flexible wall 58 can return to its normal position as seen in FIG. 5 with the lock portion of cam and lock pin 52' engaged against the shoulder 62.

In both embodiments disclosed, with the rigid walls of the support member completely enclosing the flag, these walls will take most of the loading of the bowden cable assembly and there will be very little load on the snap tab after the cable flag is assembled to the support member.

What is claimed is:

1. A motion-transmitting remote control assembly for use in a vehicle and adapted to be secured to a support member fixed to the body of the vehicle, said motion-transmitting remote control assembly including a flexible conduit, a flexible motion-transmitting core element movably supported by said conduit with the ends thereof extending from the ends of said conduit, a support fitting secured to one end of said conduit and having a tubular portion encircling one end of said core element out of engagement therewith, and a cable flag extending radially therefrom with intervening shoulders on opposite sides thereof, said support member having wall means extending from one surface thereof defining a socket cavity for said cable flag, one of said cable flag or said wall means including a flexible wall portion having cam and lock means adjacent to a free end thereof defining a protuberance hindering movement of said cable flag into said socket cavity and the other including an abutment portion thereon against which the lock portion of said cam and lock means can engage whereby to releasably lock said cable flag to said support member, with said core element extending substantially parallel to said one surface of said support member.

2. A motion-transmitting remote control assembly according to claim 1 wherein said wall means of said support member includes said flexible wall portion having said cam and lock means extending therefrom to define with the remainder of said wall means a restricted opening through said socket cavity for said cable flag, said cam and lock means defining said protuberance hindering movement of said cable flag into said socket cavity and, wherein said abutment portion is on said cable flag which has an aperture extending from opposite faces thereof in alignment with said cam and lock means to receive said cam and lock means.

3. A motion-transmitting remote control assembly according to claim 1 wherein said cable flag includes two spaced-apart rigid wall portions extending radially from said tubular portion with said flexible wall portion therebetween, said flexible wall portion being integral at one end with said tubular portion of said support fitting and extending radially from said tubular portion, said cam and lock means being positioned adjacent to the free end of said flexible wall portion, and wherein said wall means of said support member define a socket cavity to receive said cable flag with one wall of said wall means providing an abutment shoulder portion therein adjacent to the bottom of said socket cavity against which the lock portion of said cam and lock means on said flange means abuts when said flange means is fully seated in said cavity 4. A motion-transmitting remote control assembly including a flexible conduit, a flexible motion-transmitting core element movably support by said conduit with the ends thereof extending from the ends of said conduit, a support fitting operatively fixed on one end of said conduit, said support fitting including a flag means extending radially out from said conduit, a support member adapted for attachment to a support structure, said support member having wall means extending from one surface thereof defining a socket to slidably receive said flag means, said flag means and said wall means defining detent means including a snap tab on said flag means or said wall means and an abutment for said snap tab on the other of said means whereby with said flag means positioned in said socket of said support member it is releasably retained therein by said detent means, with said core element extending substantially parallel to said one surface of said support member.

5. A motion-transmitting remote control assembly according to claim 4 wherein said snap tab is on said wall means of said support member, said wall means including a flexible wall having a cam and lock means extending therefrom to define with the remainder of said wall means a restricted socket opening for said flag means and wherein said abutment for said snap tab is on said flag means and is formed by an aperture extending through said flag means to receive said cam and lock means.

6. A motion-transmitting remote control assembly according to claim 1 wherein said snap tab is on said flag means, said flag means including two spaced apart rigid wall portions and a flexible wall therebetween, the free end of said flexible wall having said snap tab thereon and, wherein said abutment is on said wall means, one wall of said wall means having an abutment shoulder therein adjacent to the bottom of said socket cavity against which said snap tab can engage.

7. A motion-transmitting remote control assembly including a flexible conduit, a flexible motion-transmitting core element movably supported by said conduit with the ends thereof extending from the ends of said conduit, a cable support and anti-rotation fitting operatively fixed on one end of said conduit with said core element extending therethrough, said cable support and anti-rotation clip including a flag means fixed to and extending radially outward from said conduit, a support member adapted for attachment to a support structure, said support member having an elongated slot opening extending from one surface thereof defining a socket to slidably receive said flag means, said flag means and said support member defining a releasable detent arrangement whereby with said flag means fully inserted into said socket of said support member said cable support and anti-rotation fitting is releasably secured to said support means.

8. A motion-transmitting remote control assembly according to claim 7 wherein said elongated slot opening in said support member is defined by spaced apart inner peripheral wall means, said wall means including a flexible wall having a cam and lock means extending therefrom to provide a detent means and wherein said flag means is provided with an abutment shoulder to thereby define said releasable detent arrangement.

9. A motion-transmitting remote control assembly according to claim 7 wherein said flag means includes rigid wall portions and at least one flexible wall portion defining a flexible detent means adapted to engage an abutment surface 10. A motion-transmitting remote control assembly including a flexible conduit means, a flexible motion-transmitting core element movably supported by said conduit means with the ends thereof extending from the ends of said conduit means, said conduit means including a radially outward extending, axially elongated flag means for telescopic assembly with an apertured component, said flag means having a rigid portion and a flexible detent portion movable transversely to the direction of assembly of said flag into said apertured component so as to exert a snap retaining action on said apertured component, said detent portion including an inclined entering face and a retaining face for cooperation with the apertured component.

11. A motion-transmitting remote control assembly including a flexible conduit, a flexible motion-transmitting core element movably supported by said conduit with the ends thereof extending from the ends of said conduit, and a cable support and anti-rotation fitting operatively fixed to one end of said conduit, said cable support and anti-rotation fitting including an elongated flag means insertable within a complementary support member aperture, a body section fixed to said conduit and from which said flag means extends radially, said body section having a longitudinally extending aperture therethrough to slidably receive said core element, said body section further having a clamping surface for engaging one side of a support member when said flag means has been fully inserted into the aperture therein, said flag means having a flexible detent means extending from a main rigid body portion thereof for engaging a side portion of the support member oppositely disposed from the side which is engaged by said clamping surface of said body section.

12. A motion-transmitting remote control assembly including a flexible conduit means, a flexible motion-transmitting core element movably supported by said conduit means with the ends thereof extending from the ends of said conduit means, said conduit means including a tubular body means in which said core element is movably supported and at least one axially elongated, flange means extending radially outward from said tubular body means and defining a snap in type fastener for application to an apertured support member, said tubular body means having a clamping surface for engaging one side of an apertured support member, said flange means including a substantially rigid section means extending from said tubular body means, and a laterally flexible section means integrally connected at least at one end thereof with said rigid section means, said flange means in cross section presenting an outer periphery of non-circular shape defining a cross section area of a size at its free end entering extremity to facilitate insertion thereof within a complementary aperture in an apertured support member, said flexible section means having a portion thereof extending laterally outward from a peripheral surface of said substantially rigid section means and adapted to move laterally toward said peripheral surface of said substantially rigid section means upon initial insertion of said flange means into an apertured support member and to automatically spring outwardly into interlocking relation with a surface of an apertured support member adjacent to the aperture therein and which is axially spaced from a surface of the apertured support member engaged by said clamping surface.

* * * * *

UNITED STATES PATENT AND TRADEMARK OFFICE
CERTIFICATE OF CORRECTION

PATENT NO. : 4,023,435
DATED : May 17, 1977
INVENTOR(S) : Brian J. LaDue

It is certified that error appears in the above-identified patent and that said Letters Patent are hereby corrected as shown below:

Column 1, line 18, "that end" should read --that one end--.

Column 4, line 66, "the flag" should read --the cable flag--.

Column 5, line 58, "support by" should read --supported by--.

Column 6, line 56, "abutment surface" should read --abutment surface on said support member when said flag means is fully inserted into said elongated slot opening in said support member.--

Signed and Sealed this

Twentieth Day of September 197

[SEAL]

Attest:

RUTH C. MASON
Attesting Officer

LUTRELLE F. PARKER
Acting Commissioner of Patents and Trademark